(12) United States Patent
Kamiyama

(10) Patent No.: US 9,566,825 B2
(45) Date of Patent: Feb. 14, 2017

(54) VEHICLE WHEEL

(71) Applicant: HONDA MOTOR CO., LTD., Minato-Ku, Tokyo (JP)

(72) Inventor: Youichi Kamiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/770,236

(22) PCT Filed: Feb. 19, 2014

(86) PCT No.: PCT/JP2014/053849
§ 371 (c)(1),
(2) Date: Aug. 25, 2015

(87) PCT Pub. No.: WO2014/132851
PCT Pub. Date: Sep. 4, 2014

(65) Prior Publication Data
US 2016/0001596 A1    Jan. 7, 2016

(30) Foreign Application Priority Data

Feb. 28, 2013  (JP) .................................. 2013-038219

(51) Int. Cl.
*B60B 21/12* (2006.01)
*B60B 21/02* (2006.01)

(52) U.S. Cl.
CPC .............. *B60B 21/12* (2013.01); *B60B 21/02* (2013.01); *B60B 2900/111* (2013.01); *B60B 2900/133* (2013.01)

(58) Field of Classification Search
CPC .... B60B 21/12; B60B 21/02; B60B 2900/111; B60B 2900/1133
USPC ......... 152/381.5, 381.6, 400, 516, 518, 519, 152/520; 301/6.91
See application file for complete search history.

(56) References Cited

U.S. PATENT DOCUMENTS

| | | | |
|---|---|---|---|
| 6,422,655 B1 * | 7/2002 | Britton | B60C 19/002 152/153 |
| 6,516,849 B2 * | 2/2003 | Flament | B60C 3/06 152/381.5 |
| 7,690,410 B2 * | 4/2010 | Kamiyama | B60B 3/044 152/381.5 |
| 8,196,628 B2 * | 6/2012 | Fowler-Hawkins | B60C 19/002 152/339.1 |

(Continued)

FOREIGN PATENT DOCUMENTS

JP   2008126806 A   6/2008
JP   2009107357 A   5/2009
(Continued)

*Primary Examiner* — S. Joseph Morano
*Assistant Examiner* — Jean Charleston
(74) *Attorney, Agent, or Firm* — Carrier Blackman & Associates, P.C.; Joseph P. Carrier; Jingli Wang

(57) ABSTRACT

A vehicle wheel of the present invention, includes: a sub air chamber member which serves as a Helmholtz resonator and is fixed to an outer circumferential surface of a well portion in a tire air chamber; a first standing wall surface formed such as to stand from the outer circumferential surface of the well portion outward in radial direction and extend in circumferential direction of the outer circumferential surface; and a second standing wall surface formed on the well portion such as to face the first standing wall surface in width direction of the outer circumferential surface.

5 Claims, 7 Drawing Sheets

(56) References Cited

U.S. PATENT DOCUMENTS

2001/0007268 A1\* 7/2001 Yukawa ............... B60B 21/023
152/381.6
2009/0108666 A1 4/2009 Kashiwai et al.

FOREIGN PATENT DOCUMENTS

| JP | 2012016973 A | 1/2012 |
| JP | 2012051397 A | 3/2012 |

\* cited by examiner

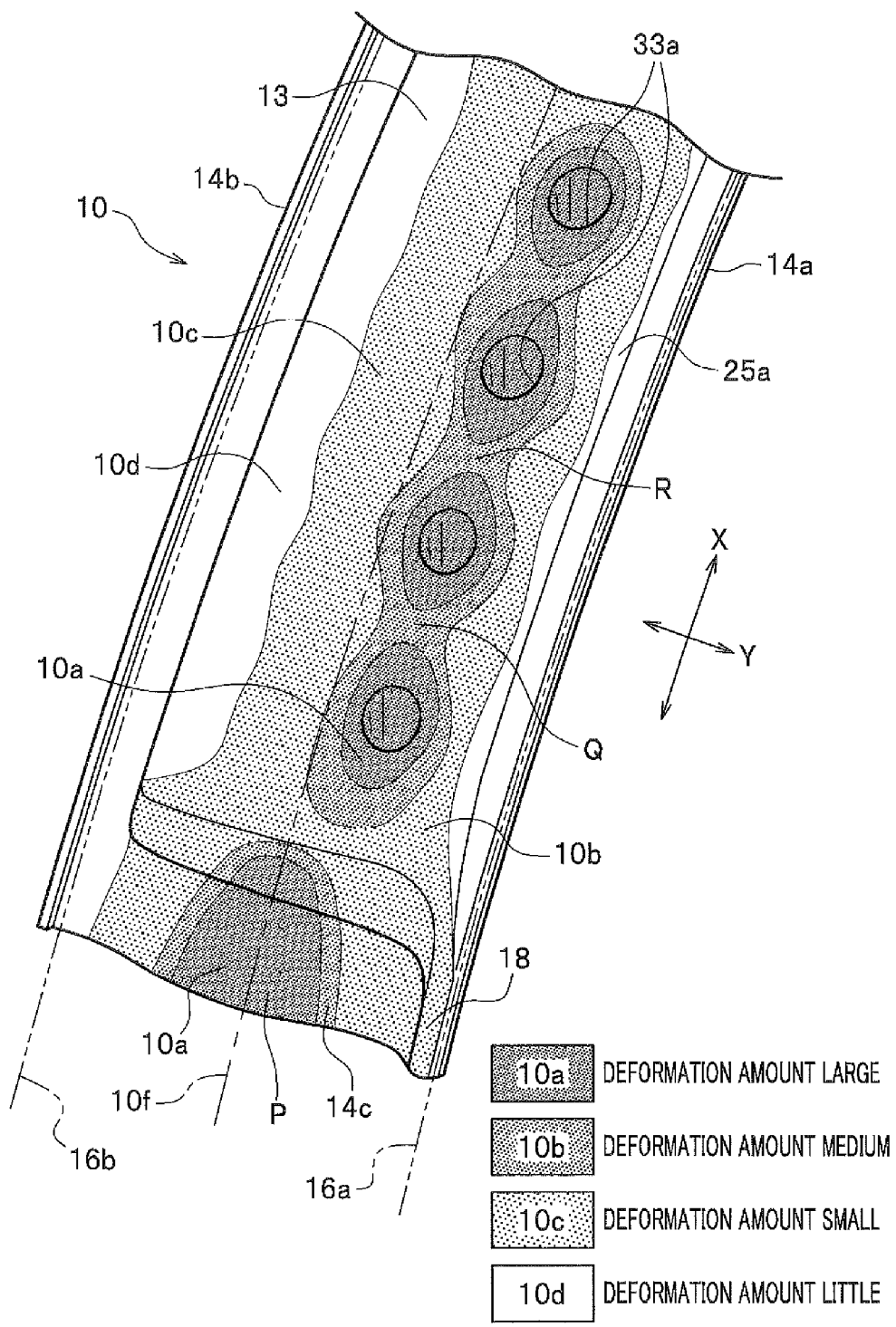

VEHICLE WHEEL

TECHNICAL FIELD

The present invention relates to a vehicle wheel.

BACKGROUND ART

Conventionally, as a wheel that reduces the road noise caused by air column resonance in the air chamber of a tire, there are presented various wheels provided with Helmholtz resonators each having a sub air chamber communicating with the air chamber of a tire through a communication hole. As such a vehicle wheel, desirable is a vehicle wheel that has a structure in which a Helmholtz resonator (a sub air chamber member) can be easily and firmly attached to the outer circumferential surface of the well portion. In this situation, the inventor has already presented a vehicle wheel with a structure that includes a sub air chambers on the inner side of a main body portion formed by an upper plate and a bottom plate, wherein the main body portion is attached to the outer circumferential surface of a well portion through the plate-shaped edge portions respectively extending from the respective sides of this main body portion (for example, see Patent Literature 1).

In more detail, this vehicle wheel is provided with a pair of standing wall surfaces formed such as to extend along the circumferential direction of the outer circumferential surface of the well portion, and the main body portion is disposed substantially at the center between the standing wall surfaces facing each other. The respective tip ends of the edged portions extending from the main body portion are engaged to the respective standing wall surfaces.

Further, this vehicle wheel is provided with joint portions at which the above-described upper plate is partially recessed toward the sub air chamber, the above-described bottom plate is correspondingly and partially recessed toward the sub air chamber, and the recessed portions are joined with each other. Ten such joint portions are formed arrayed in a line of the center line of the main body portion along the longitudinal direction (wheel circumferential direction) of the sub air chamber member.

Such joint portions join the upper and bottom plates to reduce the variation in the inner volume of the sub air chamber, and realizes a greater effect on the silencing function.

RELATED ART DOCUMENT

Patent Literature

Patent Literature 1: JP 2012-051397 A

DISCLOSURE OF THE INVENTION

Problems to be Solved by the Invention

In a conventional vehicle wheel (for example, see Patent Literature 1), the closer to the central portion in the wheel width direction from the edge portions firmly constrained by a pair of standing wall surfaces, the larger deformation caused on the sub air chamber member by a centrifugal force during rotation of the wheel. In other words, the deformation amount (the lifted degree from the outer circumferential surface of the well portion) by the centrifugal force of the sub air chamber member becomes the largest on the center line of the main body portion.

However, in a conventional vehicle wheel, a plurality of joint portions is formed on the center line where the deformation amount becomes the largest as described above. These joint portions cause an increase in the mass factor of the centrifugal force ($F=mr\omega^2$: where m is the mass, r is the radius, and $\omega$ is the angular speed). This increase in the deformation amount of the sub air chamber member causes a release of the engagement of the edge portions to the pair of standing wall surfaces. In other words, the increase in the deformation amount decreases the critical rotational speed that detaches the sub air chamber member from the well portion.

In this situation, an object of the present invention is to provide a vehicle wheel that allows setting the critical rotational speed of the wheel to a higher speed while satisfactorily maintaining the effect of reducing the variation of inner volume of the sub air chamber caused by the joint portions.

Means for Solving the Problems

For solution of the above-described problems, according to the present invention, a vehicle wheel includes: a sub air chamber member which serves as a Helmholtz resonator and is fixed to an outer circumferential surface of a well portion in a tire air chamber; a first standing wall surface formed such as to stand from the outer circumferential surface of the well portion outward in radial direction and extend in circumferential direction of the outer circumferential surface; and a second standing wall surface formed on the well portion such as to face the first standing wall surface in width direction of the outer circumferential surface, wherein the sub air chamber member is formed from a resin and includes: a main body portion including a bottom plate disposed on the outer circumferential surface side of the well portion, an upper plate forming a sub air chamber between the upper and bottom plates, and a communication hole for communication between the sub air chamber and the tire air chamber; and edge portions that join the upper and bottom plates at both side portions of the main body portion in the width direction, and are engaged to respective groove portions formed on the first standing wall surface and the second standing wall surface; and wherein the main body portion is provided with plural joint portions that are recessed toward inside the sub air chamber from either or both of the upper and bottom plates to partially join the upper and bottom plates, the joint portions being formed along the circumferential direction such as to be biased to a side of either the edge portion engaged to the first standing wall surface or the edge portion engaged to the second standing wall surface.

In such a vehicle wheel, the plural joint portions formed in the circumferential direction of the main body portion are disposed such as to be biased to either the edge portion engaged to the first standing wall surface or the edge portion engaged to the second standing wall. Accordingly, these joint portions are firmly constrained by the first standing wall surface or the second standing wall surface on the side to which the joint portions are biased. Thus, this vehicle wheel more effectively prevents the deformation of the sub air chamber member when a centrifugal force is applied to the joint portions, differently from a conventional vehicle wheel (for example, see Patent Literature 1) in which plural joint portions are disposed on the center line.

Further, such a vehicle wheel can also be arranged such that: the main body portion is longitudinally formed such as to curve, matching a curvature in the circumferential direction of the outer circumferential surface; the groove portions are annular circumferential grooves formed along the circumferential direction of the outer circumferential surface of the well portion; and the edge portions are longitudinally fitted in the circumferential grooves.

In this vehicle wheel, the main body portion of the sub air chamber member is disposed on the outer circumferential surface, along the circumferential direction of the outer circumferential surface of the well portion. In this vehicle wheel, a centrifugal force caused when the wheel rotates is evenly applied to the entire length in the longitudinal direction of the sub air chamber member. Accordingly, by this vehicle wheel, the support stability of the sub air chamber member to the rim during high speed rotation of the wheel is further improved.

Still further, such a vehicle wheel can include: a protruding portion provided inside thereof with the communication hole, wherein the protruding portion is arranged such as to biased from a central portion of the main body portion to a side of either of the edge portions in the width direction, and wherein the joint portions are biased to the side of the edge portion to which the protruding portion is biased.

In this vehicle wheel, the protruding portion and the joint portions are arranged such as to be biased to the side of either of the edge portions that are engagingly fixed respectively to the first standing wall surface and the second standing wall surface and firmly constrained by these standing wall surfaces.

Accordingly, in comparison with a vehicle wheel in which the protruding portion and the joint portions are disposed at the central portion in the width direction of the main body portion, the above-described vehicle wheel can more effectively prevent the deformation of the sub air chamber member caused when a centrifugal force is applied to the protruding portion and the joint portions.

Yet further, such a vehicle wheel can be arranged such that: the first standing wall surface is formed on an annular standing wall standing on the well portion; the sub air chamber member includes a rotation preventing member that protrudes in wheel width direction from the either of the edge portions to prevent the sub air chamber member from deviating in the wheel circumferential direction by that the rotation preventing member is fitted into a cut-away portion formed on the standing wall; and the joint portions are formed, being biased to the edge portion side on which the rotation preventing member is formed.

In such a vehicle wheel, the joint portions, which act as a mass factor for inertia force, are formed being biased to the edge portion side where the rotation preventing member is formed. Accordingly, deviation of the sub air chamber member due to inertia force caused on the joint portions during acceleration or deceleration of wheel rotation can be more surely prevented by the rotation preventing member.

Further, such a vehicle wheel can be arranged such that the joint portions are formed in an array on a line along wheel circumferential direction.

In this vehicle wheel, as the joint portions, which act as a mass factor for centrifugal force, are arrayed in a line along the wheel circumferential direction, designing of the mass balance, in the wheel width direction, of the sub air chamber member becomes easy.

Advantages of the Invention

In comparison with a conventional vehicle wheel, a vehicle wheel according to the present invention makes it possible to more effectively prevent the deformation of a sub air chamber member caused when a centrifugal force is applied to joint portions. Thus, for a vehicle wheel according to the present invention, the critical rotational speed of the wheel can be set to a higher speed, while satisfactorily maintaining the effect of reducing the variation of the inner volume of the sub air chamber caused by the joint portions.

BRIEF DESCRIPTION OF THE DRAWINGS

FIG. 6 is a partial enlarged perspective view in the vicinity of the end portion of the main body portion of the sub air chamber member in the embodiment of the present invention, representing the state of deformation of the sub air chamber member due to the centrifugal force generated at the maximum assumed rotational speed of the wheel, as deformation amount distribution.

EMBODIMENT FOR CARRYING OUT THE INVENTION

Figure 1:
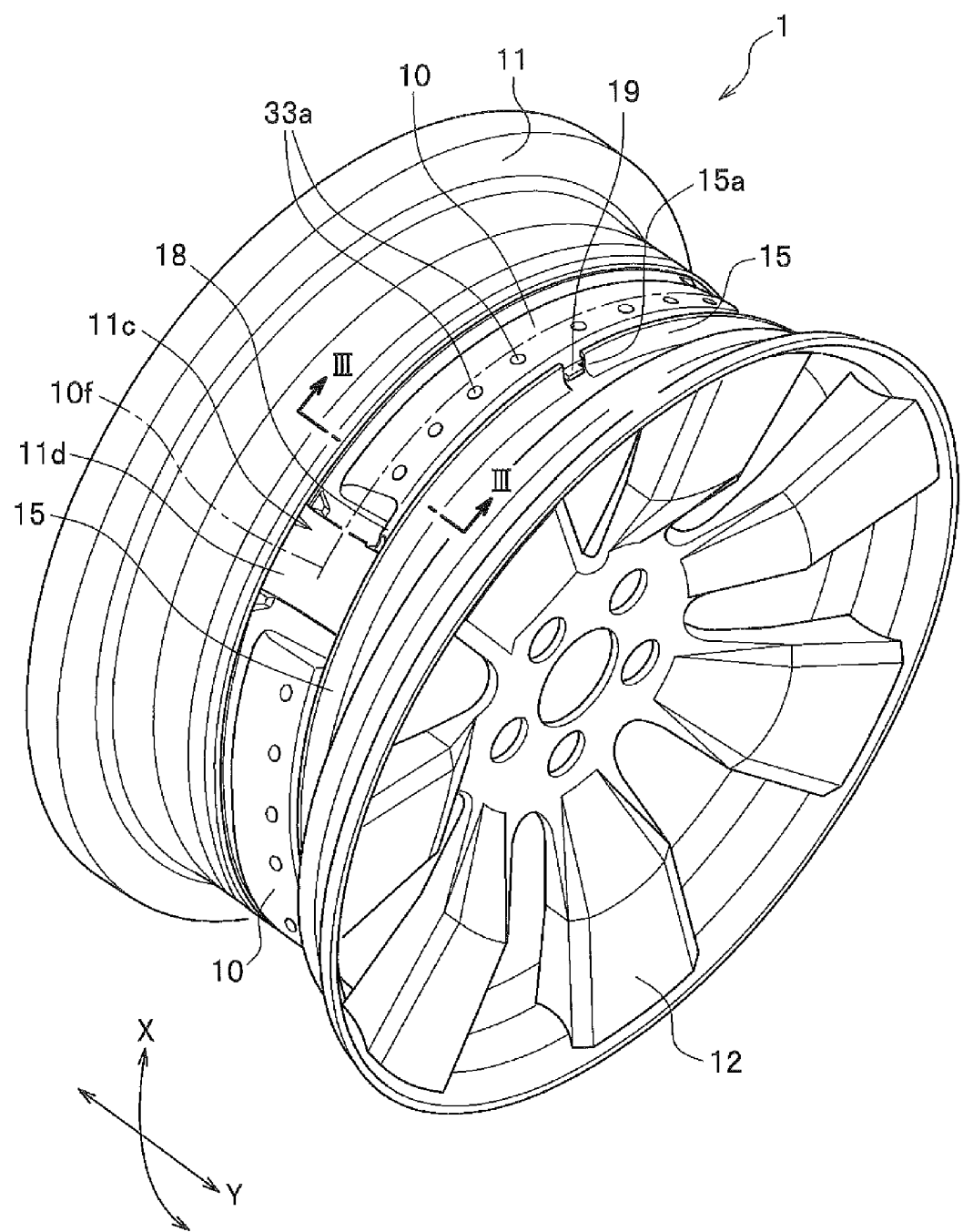
FIG. 1 is a perspective view of a vehicle wheel according to an embodiment of the present invention.

An embodiment according to the present invention will be described below in detail, referring to the drawings appropriately.

FIG. 1 is a perspective view of a vehicle wheel 1 according to an embodiment of the present invention.

As shown in FIG. 1, the vehicle wheel 1 in this embodiment includes a plurality of sub air chamber members 10, as Helmholtz resonators, at equal intervals along the wheel circumferential direction X. Incidentally, although a vehicle wheel has four sub air chambers 10 in this embodiment, a vehicle wheel according to the present invention may have two, three, or more than four sub air chamber members 10.

Figure 3:
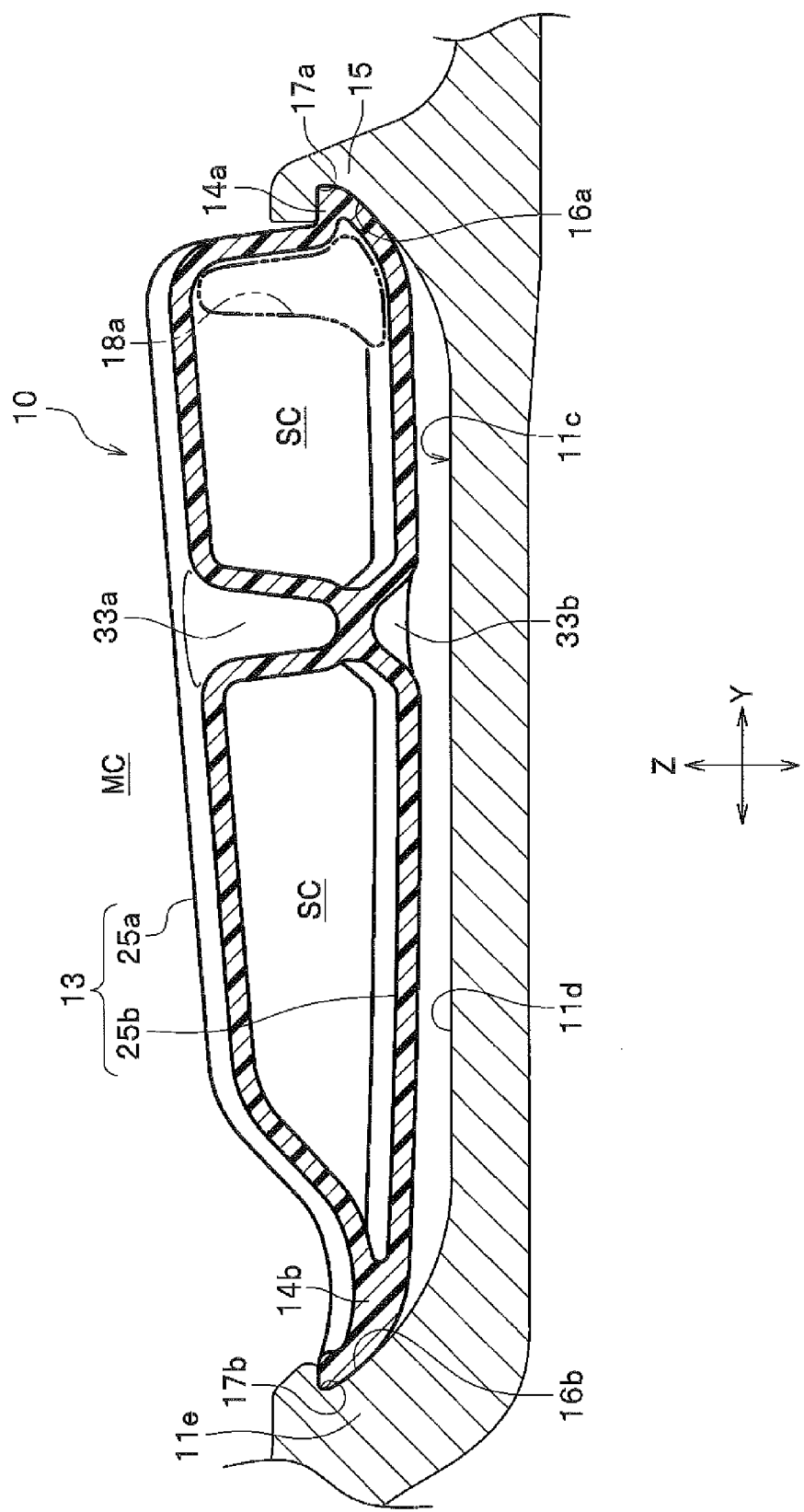
FIG. 3 is a cross-sectional view of the sub air chamber member disposed on a well portion, and is a partial enlarged cross-sectional view taken along the line III-III in FIG. 1.

In FIG. 1, symbol 33a represents upper joint portions forming joint portions 33, together with bottom joint portions 33b (see FIG. 3).

This vehicle wheel 1 is mainly featured by that plural joint portions 33 of the main body portion 13 (see FIG. 2) of a sub air chamber member 10 are formed such as to be biased from a center line 10f (see FIG. 2) to the edge portion 14a (see FIG. 2) along the wheel width direction Y of the sub air chamber member 10 in this embodiment.

In this embodiment, although description will be made on a structure in which joint portions 33 are biased to the edge portion 14a (see FIG. 2), the present invention can also be applied, as described later, to a structure in which plural joint portions 33 are formed, being biased from the center line 10f (see FIG. 2) to the edge portion 14b (see FIG. 2).

Herein, the entire configuration of the vehicle wheel 1 will be first described.

The vehicle wheel 1 in this embodiment is provided with a rim 11 and a disc 12 for connecting the rim 11 to a hub (not shown). In FIG. 1, symbol 11*d* represents the outer circumferential surface of a well portion 11*c*, and a sub air chamber member 10 is fitted into the well portion 11*c*, as described later in detail. Further, symbol 15 represents an annular standing wall standing at the outer circumferential surface 11*d* of the well portion 11*c* such as to extend along the circumferential direction of the rim 11. Incidentally, the sub air chamber member 10 is as described later engaged to the standing wall 15. Symbol 15*a* represents a cut-away portion, of the standing wall 15, into which a rotation preventing member 19 is fitted when the sub air chamber member 10 is engaged to the standing wall 15.

Figure 2:
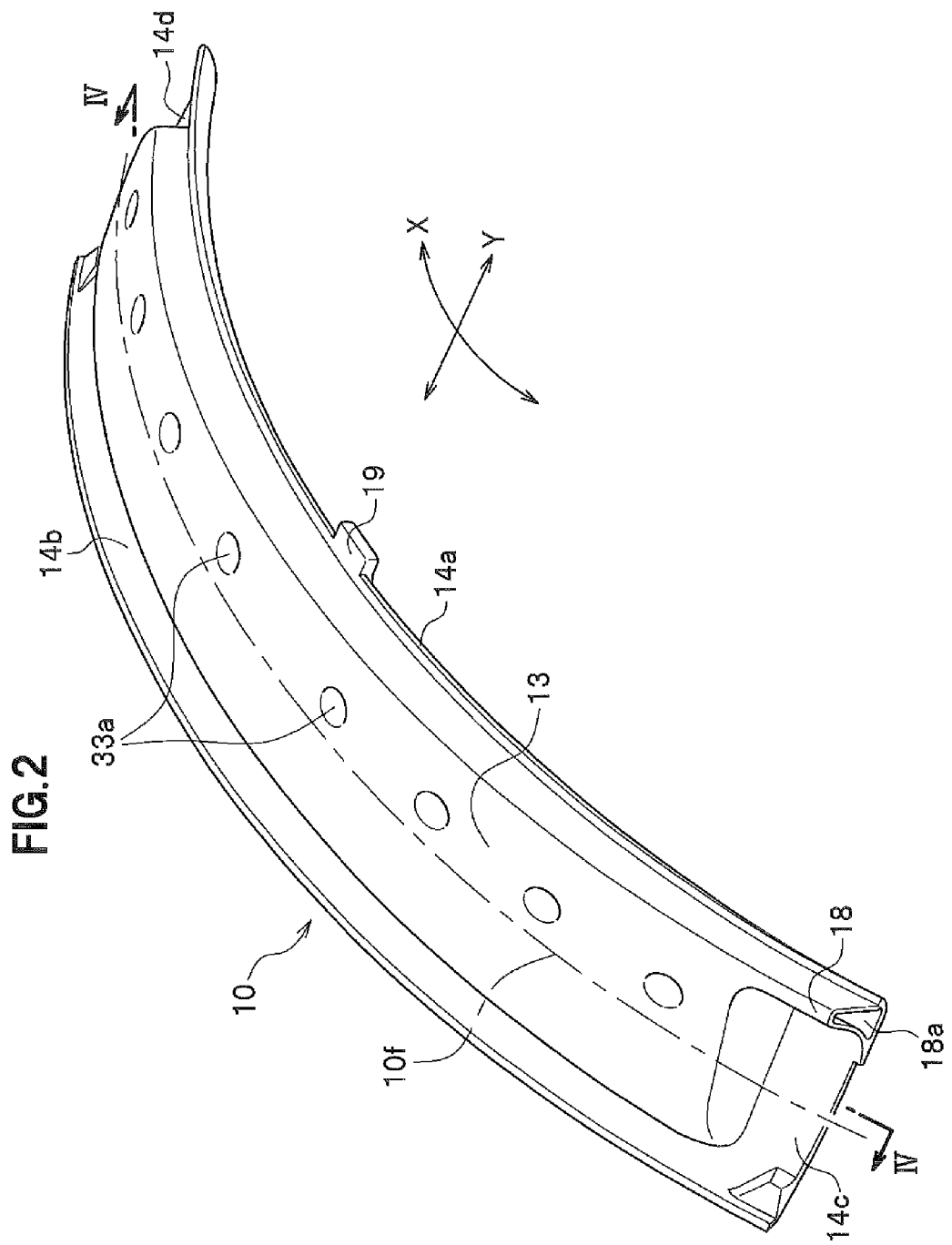
FIG. 2 is an entire perspective view of a sub air chamber member.

FIG. 2 is an entire perspective view of a sub air chamber 10.

The sub air chamber member 10 is a member longitudinal in one direction (wheel circumferential direction X), as shown in FIG. 2, and is provided with a main body portion 13, a tube body 18, edged portions 14*a*, 14*b*, and extending portions 14*c*, 14*d*.

The main body portion 13 is longitudinally formed such as to curve, matching the curvature along the circumferential direction of the outer circumferential surface 11*d* (see FIG. 1), and has a sub air chamber SC (see FIG. 3) inside thereof, as described later.

Further, the main body portion 13 is provided with a plurality of joint portions 33 (eight in this embodiment) arrayed in a line in the wheel circumferential direction X. As described later in detail, these joint portions 33 are formed such as to be biased from the center line 10*f* (see FIG. 2) to the edge portion 14*a*. In FIG. 2, symbol 33*a* represents the upper joint portions.

The tube body 18 is arranged such as to protrude from the end portion in the longitudinal direction (the end portion in the wheel circumferential direction X) of the main body portion 13, in the wheel circumferential direction X, in other words, in the circumferential direction of the outer circumferential surface 11*d* (see FIG. 1).

The tube body 18 is arranged such as to be biased to the edge portion 14*a* from the center line 10*f* in the wheel width direction Y of the main body portion 13, in other words, the width direction of the outer circumferential surface 11*d* (see FIG. 1).

Although, in the above-described embodiment, the tube body 18 is formed integrally with the later-described extending portion 14*c*, it is also possible to make the tube body 18 protrude from the main body portion 13, separately and independently from the extending portion 14*c*.

The communication hole 18*a* is formed inside the tube body 18. The communication hole 18*a* makes the sub air chamber SC (see FIG. 3) inside the main body portion 13 and a later-described tire air chamber MC (see FIG. 3) communicate with each other.

The cross-sectional shape of the communication hole 18*a* is preferably a cross-sectional shape, which is longitudinal in wheel radial direction Z (see FIG. 3).

As described above, although the tube body 18 having such a communication hole 18*a* is biased to the edge portion 14*a* in this embodiment, it is also possible to make an arrangement such that the tube body 18 is biased to the edge portion 14*b* according to the present invention.

The edge portion 14*a* and the edge portion 14*b* are formed along the respective side portions, of the main body portion 13 in the wheel width direction Y, and extend in the wheel circumferential direction X. The edge portions 14*a*, 14*b* are engagingly fixed respectively to the first standing wall surface 16*a* (see FIG. 3) and the second standing wall surface 16*b* (see FIG. 3). The first standing wall surface 16*a* is formed on the annular standing wall 15 standing from the well portion 11*c* (see FIG. 1). The second standing wall surface 16*b* is formed on the well portion 11*c*, facing the first standing wall surface 16*a* in the wheel width direction Y. The edge portion 14*a* and the edge portion 14*b* are engagingly fixed respectively to a groove portion 17*a* (see FIG. 3) formed on the first standing wall surface 16*a* and a groove portion 17*b* (see FIG. 3) formed on the second standing wall surface 16*b* to thus fix the main body portion 13 to the well portion 11*c*.

The extending portion 14*c* and the extending portion 14*d* are formed by integrating the plate-shaped body portion extending in the wheel circumferential direction X from the end portion of a later-described bottom plate 25*b* (see FIG. 3) of the main body portion 13 in the wheel circumferential direction X, and plate-shaped portions extending in the wheel circumferential direction X from the end portions of the edge portions 14*a*, 14*b* in the wheel circumferential direction X. Incidentally, the extending portions 14*c*, 14*d* are located on an extension, in the wheel circumferential direction X, of the edge portions 14*a*, 14*b*, being curved to match the curvature of the outer circumferential surface 11*d* (see FIG. 1) in the circumferential direction.

Incidentally, symbol 19 represents a rotation preventing member for preventing deviation along the wheel circumferential direction X of the sub air chamber member 10 by that the rotation preventing member 19 is fitted into the cut-away portion 15*a* (see FIG. 1) of the standing wall 15 (see FIG. 1) when the sub air chamber member 10 is fixed to the outer circumferential surface 11*d* (see FIG. 1) of the well portion 11*c* (see FIG. 1). The rotation preventing member 19 is formed by a piece formed in a rectangular shape in a plan view formed such as to protrude from the edge portion 14*a* in the wheel width direction Y.

Symbol 33*a* represents a later-described upper joint portion (see FIG. 3).

FIG. 3 referred to below is a cross-sectional view of the sub air chamber member 10 disposed on the well portion 11*c*, and is a partial enlarged cross-sectional view taken along III-III in FIG. 1.

As shown in FIG. 3, the main body portion 13 of the sub air chamber member 10 is provided with an upper plate 25*a* and a bottom plate 25*b* forming a sub air chamber SC between the upper and bottom plates 25*a*, 25*b*. Incidentally, although the upper and bottom plates 25*a*, 25*b* have the same thickness in this embodiment, the upper and bottom plates 25*a*, 25*b* may respectively have thicknesses different from each other.

The upper plate 25*a* forms the sub air chamber SC by curving such as to have a bulge above the bottom plate 25*b* disposed along the outer circumferential surface 11*d* of the well portion 11*c*.

The upper plate 25*a* is provided with upper joint portions 33*a* at the part that constructs the main body portion 13. These upper joint portions 33*a* are formed such that the upper plate 25*a* is partially recessed toward the sub air chamber SC, and are in a circular shape in plan view. As shown in FIG. 2, these upper joint portions 33*a* are formed in a quantity of eight such as to be arrayed in a line along the wheel circumferential direction X such as to be biased to the edge portion 14*a* from the center line 10*f* of the sub air chamber member 10 in the wheel width direction Y.

Returning again to FIG. 3, the bottom plate 25b is provided with bottom-side joint portions 33b at the positions corresponding to the upper joint portions 33a.

These bottom-side joint portions 33b are formed such that the bottom plate 25b is partially recessed toward the sub air chamber SC, and are in a circular shape in a plan view. These bottom-side joint portions 33b are integrated at the tip end portions thereof with the tip end portions of the upper joint portions 33a of the upper plate 25a to form joint portions 33, thus joining the upper and bottom plates 25a, 25b.

Incidentally, as shown in FIG. 2, although the joint portions 33 are forms such as to be biased to the edge portion 14a, it is also possible according to the present invention to make an arrangement such that the joint portions 33 are biased from the center line 10f (see FIG. 2) to the edge portion 14b as described above.

Further, in this embodiment, the joint portions 33 are formed by the upper joint portions 33a and the bottom-side joint portions 33b in this embodiment, according to the present invention, it is also possible to form joint portions 33 in such a manner that upper joint portions 33a recessed toward the sub air chamber SC are directly integrated with the bottom plate 25b without forming bottom-side joint portions 33b. Further, according to the present invention, it is also possible to form joint portions 33 in such a manner that bottom-side joint portions 33b recessed on the sub air chamber SC are directly integrated with the upper plate 25a without forming upper joint portions 33a.

Figure 4:
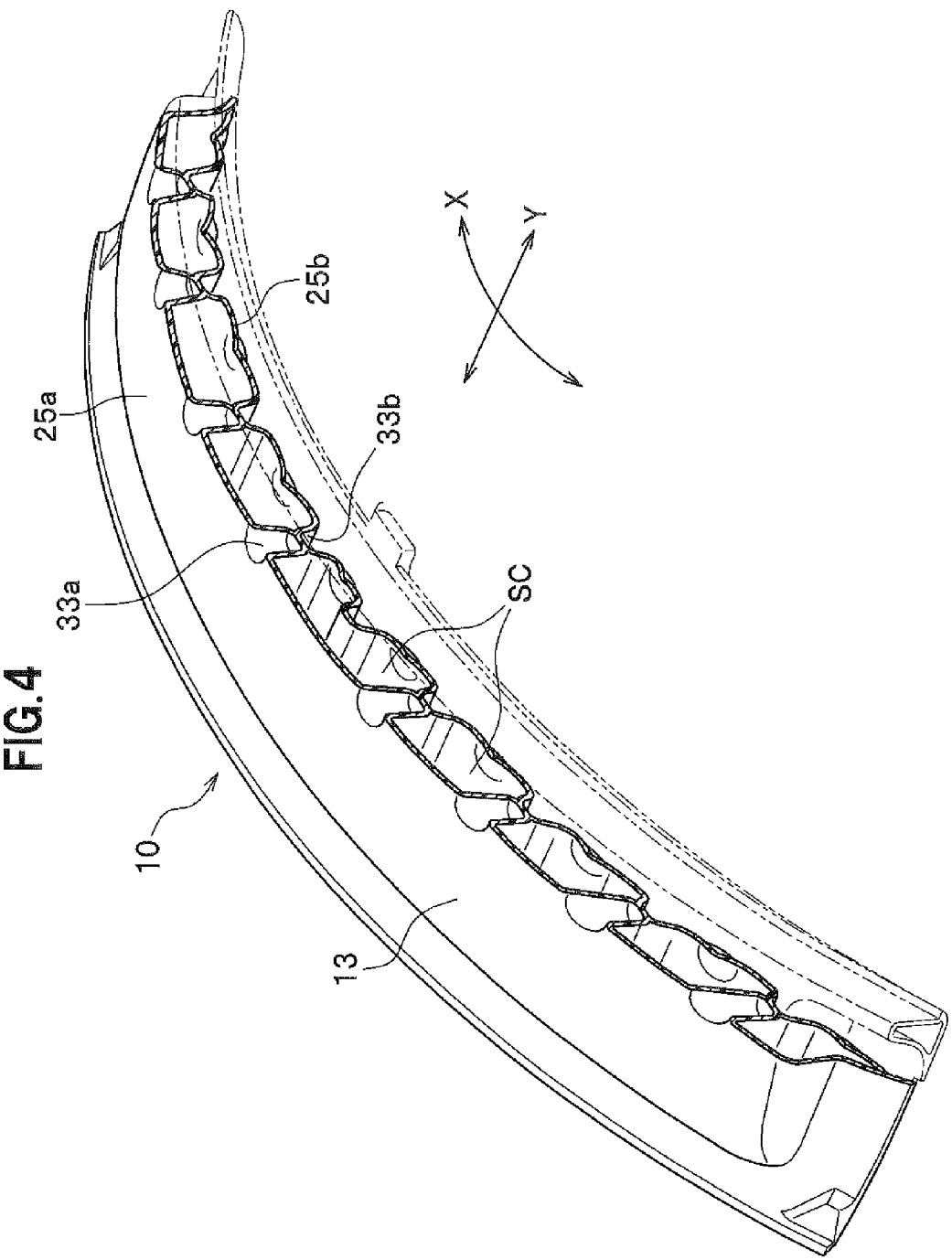
FIG. 4 is a perspective view showing the sub air chamber member cut away along the line IV-IV in FIG. 2.

FIG. 4 referred to below is a cross-sectional perspective view of the sub air chamber member 10 cut off by line IV-IV in FIG. 2.

As shown in FIG. 4, the joint portions 33 formed by the upper joint portions 33a and the bottom-side joint portions 33b joined with each other in the sub air chamber SC have a structure that improves the mechanical strength of the sub air chamber member 10 and also enables greater effect on the silencing function by reducing variation in the inner volume of the sub air chamber SC.

The inner volume of the sub air chamber SC is preferably 50-250 cc approximately. By setting the inner volume of the sub air chamber SC in this range, the sub air chamber member 10 can have sufficient effect on silencing and meanwhile enables reduction in the weight of the vehicle wheel 1 (see FIG. 1) by inhibiting an increase in the weight thereof. Further, the length of the sub air chamber member 10 along the wheel circumferential direction X (see FIG. 2) can be appropriately set in consideration of adjusting the weight of the vehicle wheel 1 and easiness in attaching to the well portion 11c, with the length of a half of the circumferential length (the circumferential length of the outer circumferential surface 11d (see FIG. 1) of the well portion 11c (see FIG. 1)) of the rim 11 (see FIG. 1) as the maximum length.

Incidentally, in FIG. 4, symbol 13 represents the main body portion, symbol 25a represents the upper plate, and symbol 25b represents the bottom plate.

Returning to FIG. 3 again, the communication hole 18a for communication between the tire air chamber MC and the sub air chamber SC is as described above has a cross-sectional shape longitudinal in the wheel radial direction Z. Concretely, in FIG. 3, as shown by virtual lines, the cross-sectional shape of the communication hole 18a is wider on the bottom plate 25b, and tapers down from the bottom plate 25b toward the outside in the wheel radial direction Z. Although the communication hole 18a preferably has a cross-sectional shape that is longitudinal in the wheel radial direction Z, the communication hole 18a may have a different cross-sectional shape such as a polygonal shape instead of a longitudinal shape. Incidentally, the cross-sectional area of the communication hole 18a preferably has a diameter larger than or equal to 5 mm if converted into a circular shape with the same cross-sectional area.

The length of a communication hole 18a is set such as to satisfy an expression for obtaining a resonant vibration frequency of a Helmholtz resonator, the expression being described by the following Expression 1.

$$f_0 = C/2\pi \times \sqrt{(S/V(L\alpha \times \sqrt{S}))}$$ Expression 1

$f_0$ (Hz): resonant vibration frequency
C (m/s): sonic speed inside sub air chamber SC (=sonic speed inside tire air chamber MC)
V (m$^3$): inner volume of sub air chamber SC
L (m): length of communication hole 18a
S (m$^2$): cross-sectional area of opening portion of communication hole 18a
α: correction factor Incidentally, the resonant vibration frequency $f_0$ is matched to the resonant vibration frequency of the tire air chamber MC.

The tube body 18 having such a communication hole 18a in this embodiment is preferably formed, as shown in FIG. 2, such as to protrude in the wheel circumferential direction X further than the end portion of the extending portion 14c in the wheel circumferential direction X.

Returning to FIG. 3 again, the edge portion 14a and the edge portion 14b join the bottom plate 25b and the upper plate 25a.

The tip ends of the edge portion 14a and the edge portion 14b are fitted respectively into the groove portion 17a of the first standing wall surface 16a and the groove portion 17b of the second standing wall surface 16b.

The thicknesses of the edge portions 14a, 14b, and the extending portions 14c, 14d (see FIG. 2) in this embodiment are set substantially the same as the thicknesses of the bottom plate 25b and the upper plate 25a. These edge portions 14a, 14b and the extending portions 14c, 14d have spring elasticity by appropriate selection of thickness and material thereof.

The sub air chamber member 10 in the above-described embodiment is formed from a resin material. As this resin material, in consideration of weight saving of the sub air chamber member 10, improvement in mass-productivity, reduction in manufacturing cost, ensuring the airtightness of the sub air chamber SC, and the like, a resin that allows blow-molding and is light and highly rigid is preferable. Particularly, polypropylene, which is durable against repeated bending fatigue, is preferable.

The rim 11 to which the sub air chamber member 10 is fitted will be described below.

The rim 11 has the well portion 11c, which is recessed toward the inner side (rotation center side) in the wheel radius direction, between the bead sheet portions (not shown) of a tire, the bead sheet potions being formed at the both end portions in the wheel width direction Y shown in FIG. 1.

The well portion 11c is provided in order to put in the bead portions (not shown) of a tire (not shown) in attaching the tire to the rim 11. Incidentally, the well portion 11c in this embodiment is formed in a cylindrical shape with substantially the same diameter throughout the wheel width direction Y.

The annular standing wall 15 stands from the outer circumferential surface 11d of this well portion 11c such as to extend along the circumferential direction of the rim 11.

Returning again to FIG. 3, the standing wall 15 is arranged, standing at the outer circumferential surface 11d such as to form the first standing wall surface 16a standing from the outer circumferential surface 11d of the well portion 11c to the outer side in the wheel radial direction Z (the upper side in the sheet of FIG. 3, the same hereinafter).

The side surface portion 11e formed on the inner side (left side in the sheet of FIG. 3) of the well portion 11c in the wheel width direction Y is provided with the second standing wall surface 16b that is arranged such as to substantially face the first standing wall surface 16a. Incidentally, the standing wall 15 in this embodiment is integrally formed with the well portion 11c in casting the rim 11.

The first standing wall surface 16a and the second standing wall surface 16b are respectively provided with the groove portion 17a and the groove portion 17b. The groove portions 17a and 17b are formed along the circumferential direction of the outer circumferential surface 11d of the well portion 11c and form annular circumferential grooves. The edge portion 14a and the edge portion 14b of the sub air chamber member 10 are fitted in the groove portions 17a and 17b. Incidentally, the groove portions 17a and 17b in this embodiment are formed by machining the standing wall 15 and the side surface portion 11e respectively.

Figure 5A:
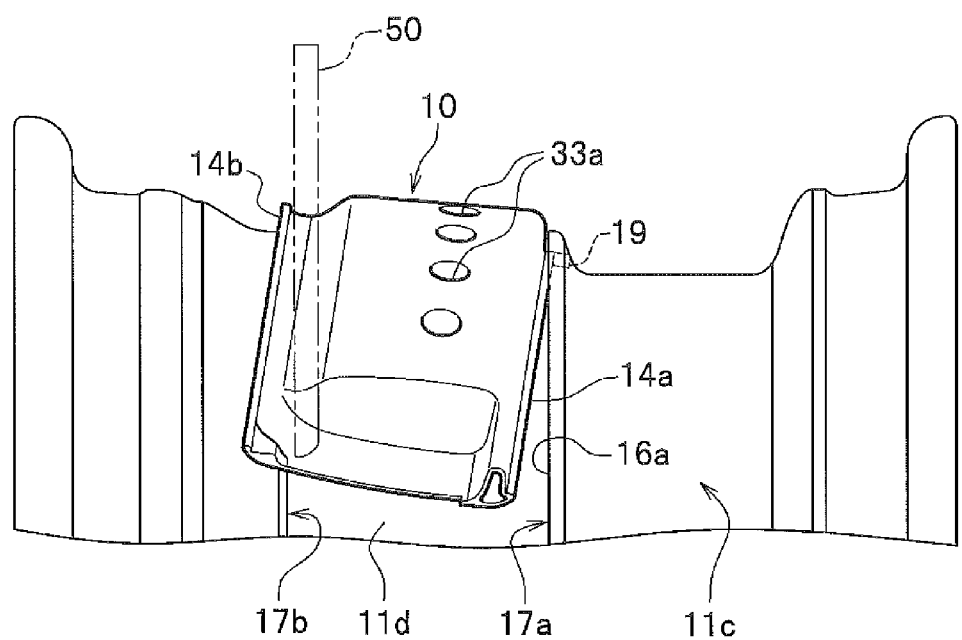
FIGS. 5A and 5B are process illustration for illustration of a method of attaching a sub air chamber member to the well portion of a rim.
Figure 5B:
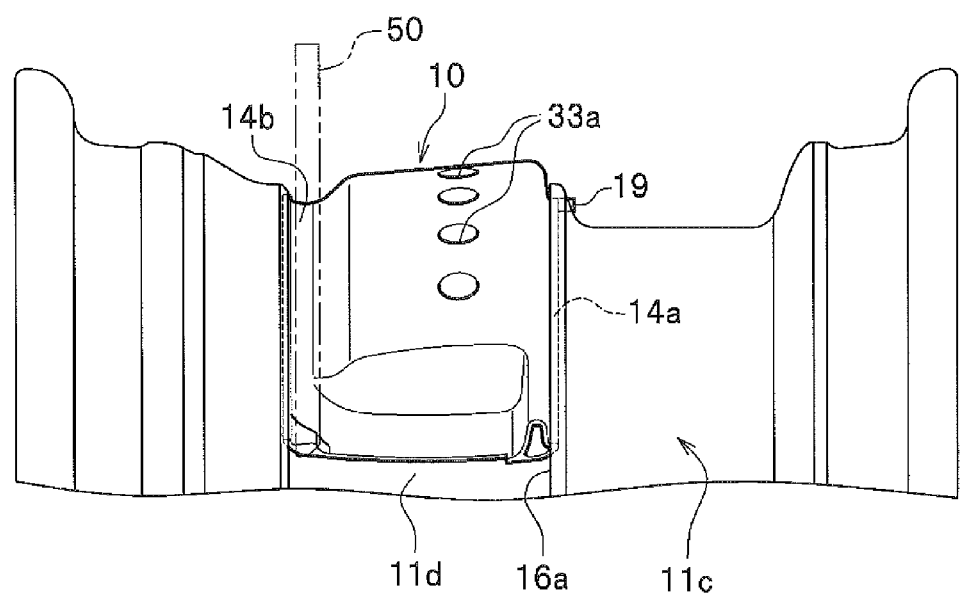

The method of attaching the sub air chamber member 10 to the well portion 11c will be described below. FIGS. 5A and 5B are process illustrations for illustrating a method for attaching the sub air chamber member 10 to the well portion 11c Incidentally, attaching of the sub air chamber member 10 to the well portion 11c in this embodiment assumes using a pusher (pressing device) 50 (see FIGS. 5A and 5B) for pressing the edge portion 14b at a position close to the groove portion 17b toward the outer circumferential surface 11d of the well portion 11c.

As the pusher 50, for example, one that presses the edge portion 14b (see FIGS. 5A and 5B) by the air pressure of an air cylinder can be adopted.

Incidentally, in FIGS. 5A and 5B, the pusher 50 is shown by virtual lines (alternate long and two short dashes lines) for the convenience of drawing.

Although the pusher 50 used in this embodiment can be, for example, a plate shaped member provided with an edge portion having an outline in an arc shape with a curvature of the sub air chamber member 10 in the longitudinal direction (the wheel circumferential direction X in FIG. 2), a pusher 50 applicable to the present invention is not limited thereto and can be changed in designing appropriately.

In this attaching method, as shown in FIG. 5A, first, the sub air chamber member 10 is inclined, and the edge portion 14a located in the vicinity of the rotation preventing member 19 is partially fitted into the groove portion 17a of the first standing wall surface 16a. Herein, as shown in FIG. 1, the rotation preventing member 19 is fitted into the cut-away portion 15a of the standing wall 15.

Then, in FIG. 5A, the pusher 50 shown by virtual lines is made contact with the edge portion 14b. Symbol 11d represents the outer circumferential surface of the well portion 119c.

Then, as shown in FIG. 5B, when the pusher 50 presses the edge portion 14b toward the outer circumferential surface 11d of the well portion 11c, as the inclination angle of the sub air chamber member 10 to the outer circumferential surface 11d of the well portion 11c becomes smaller, the edge portion 14a on the both sides sandwiching the rotation preventing member 19 is gradually fitted into the groove portion 17a of the first standing wall surface 16a.

Herein, the edge portion 14b having spring elasticity warps, corresponding to the magnitude of the pressing force of the pusher 50.

Then, when the edge portion 14b is further pressed toward the outer circumferential surface 11d of the well portion 11c, as shown in FIG. 3, the edge portion 14a and the edge portion 14b are completely fitted respectively into the groove portion 17a formed on the first standing wall surface 16a and the groove portion 17b formed on the second standing wall surface 16b. Thus, the sub air chamber member 10 is fitted to the well portion 11c.

The actions and effects of the vehicle wheel 1 in this embodiment will be described below.

As shown in FIG. 3, the vehicle wheel 1 is engagingly fixed by that the edge portions 14a, 14b are fitted into the groove portions 17a, 17b of the first and second standing wall surfaces 16a, 16b.

The closer to the central portion in the wheel width direction Y from the edge portions 14a, 14b firmly constrained respectively by the first and second standing wall surfaces 16a, 16b, the larger deformation caused on the sub air chamber member 10 by a centrifugal force during rotation of the wheel.

Figure 7:
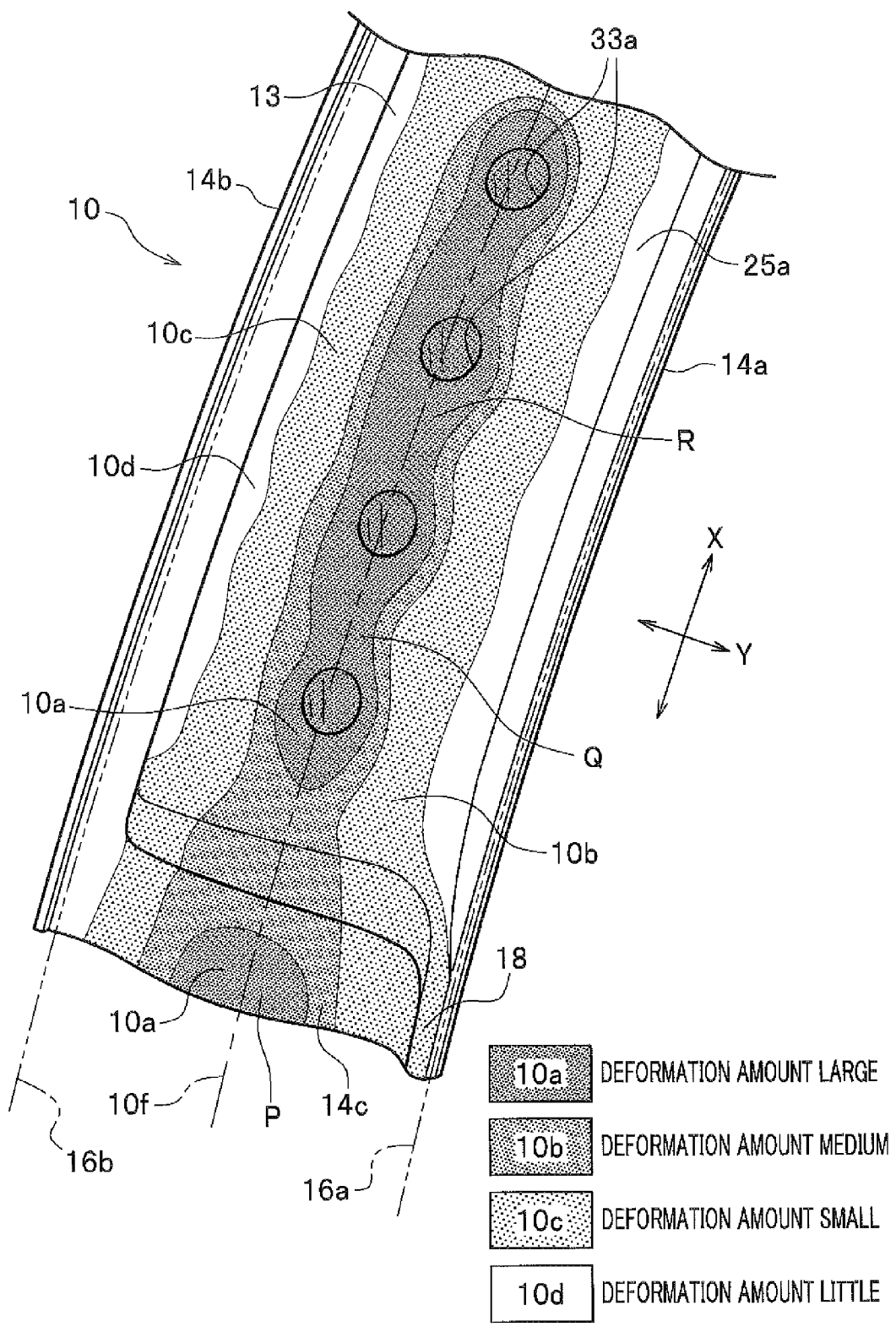
FIG. 7 is a partial enlarged perspective view in the vicinity of the end portion of the main body portion of a sub air chamber member in a referential example, representing the state of deformation of the sub air chamber member due to the centrifugal force generated at the maximum assumed rotational speed of the wheel, as deformation amount distribution.

FIG. 6 referred to below is a partial enlarged perspective view in the vicinity of the end portion of the main body portion of the sub air chamber member 10 in an embodiment of the present invention, representing the state of deformation of the sub air chamber member 10 due to the centrifugal force generated at the maximum assumed rotational speed of the wheel, as deformation amount distribution. FIG. 7 is a partial enlarged perspective view in the vicinity of the end portion of the main body portion 13 of a sub air chamber member 10 in a referential example, representing the state of deformation of the sub air chamber member 10 due to the centrifugal force generated at the maximum assumed rotational speed of the wheel, as deformation amount distribution.

Incidentally, the deformation amount herein was obtained by a simulation testing by CAE (Computer Aided Engineering).

In FIGS. 6 and 7, the shaded portion 10a out of the shaded portions categorized in three kinds by gray scale represents the region with the largest deformation amount (lifted degree) from the outer circumferential surface 11d of the well portion 11c (see FIG. 3) to the centrifugal direction. The shaded portion 10b represents the region with a medium deformation amount (lifted degree). The shaded portion 10c represents the region with a small deformation amount (lifted degree). The hollow portion 10d represents the region with little deformation.

First, the referential example shown in FIG. 7 will be described below. On a sub air chamber member 10 in this referential example, plural joint portions 33 are provided in an array in a line of the center line 10f (see FIG. 2) defined on the main body portion 13.

The region of the shaded portion 10a with the largest deformation amount (lifted degree) is widely distributed along the direction in which the joint portions 33 are arrayed.

In contrast, as shown in FIG. 6, on a sub air chamber member 10 of the vehicle wheel 1 in this embodiment, the joint portions 33 are formed being biased to the edge portion 14a. Accordingly, the darkest shaded portion 10a is significantly smaller than the darkest shaded portion 10a in FIG. 7.

Further, though not shown, the maximum value of the deformation amount of the upper plate 25a (see FIG. 3) of the sub air chamber member 10 in FIG. 6 was 82% of the maximum value of the deformation amount of the upper plate 25a (see FIG. 3) in FIG. 7. The maximum value of the deformation amount of the bottom plate 25b (see FIG. 3) was 88% of the maximum amount of the deformation amount of the bottom plate 25b (see FIG. 3) in FIG. 7.

As described above, on the vehicle wheel 1, plural joint portions 33 formed along the circumferential direction of the main body portion 13 are disposed such as to be biased to the edge portion 14a, which is engaged to the first standing wall surface 16a. Accordingly, the joint portions 33 are firmly constrained by the first standing wall surface 16a. Thus, this vehicle wheel 1 more effectively prevents the deformation of a sub air chamber member 10 caused when a centrifugal force is applied to the joint portions 33, differently from a conventional vehicle wheel (for example, see Patent Literature 1) on which plural joint portions 33 are disposed on the center line 10f.

Further, by the vehicle wheel 1, as the deformation of the sub air chamber member 10 caused when a centrifugal force is applied to the joint portions 33 can be more effectively prevented, it is possible to set the critical rotational speed (the critical rotational speed at which the sub air chamber member 10 detaches from the well portion 11c) of the wheel can be set to a higher speed, while satisfactorily maintaining the effect of reducing the variation of inner volume of the sub air chamber SC caused by the joint portions 33.

Still further, in the vehicle wheel 1, the main body portion 13 of the sub air chamber member 10 is formed longitudinally such as to curve, matching the curvature in the circumferential direction of the outer circumferential surface 11d of the well portion 11c. Further, the groove portions 17a, 17b are annular circumferential grooves formed along the circumferential direction of the outer circumferential surface 11d of the well portion 11c, and the edge portions 14a, 14b are fitted longitudinally, as described above, in these circumferential grooves.

In such a vehicle wheel 1, the main body portion 13 of the sub air chamber member 10 is disposed along the circumferential direction of the outer circumferential surface 11d of the well portion 11c. In this vehicle wheel 1, the centrifugal force caused when the wheel rotates is evenly applied to the entire length in the longitudinal direction of the sub air chamber member 10. Accordingly, by this vehicle wheel 1, the support stability of the sub air chamber member 10 to the rim 11 during high speed rotation of the wheel is further improved.

Yet further, in such a vehicle wheel 1, the above-described protruding portion 18 is provided being biased from the central portion (center line 10f) in the width direction of the main body portion 13 to the edge portion 14a, and the joint portions 33 are biased to the edge portion 14a to which the protruding portion 18 is biased.

In this vehicle wheel 1, the protruding portion 18 and the joint portions 33 are arranged such as to be biased to the edge portion 14a, which is engaged to the first standing wall surface 16a and firmly constrained by this standing wall surface 16a.

Accordingly, in comparison with a vehicle wheel in which the protruding portion 18 and the joint portions 33 are disposed at the central portion (center line 10f) in the width direction of the main body portion 13, the above-described vehicle wheel 1 can more effectively prevent the deformation of the sub air chamber member 10 caused when a centrifugal force is applied to the protruding portion 18 and the joint portions 33.

Further, in the vehicle wheel 1, the joint portions 33 are formed being biased to the edge portion 14a at which the rotation preventing member 19 is formed.

In such a vehicle wheel 1, the joint portions 33, which act as a mass factor for inertia force, are formed being biased to the edge portion 14a where the rotation preventing member 19 is formed. Accordingly, deviation of the sub air chamber member 10 due to inertia force caused on the joint portions 33 during acceleration or deceleration of wheel rotation can be more surely prevented by the rotation preventing member 19.

Still further, in the vehicle wheel 1, the joint portions 33 can be formed in a line along the wheel circumferential direction X.

In this vehicle wheel 1, as the joint portions 33, which act as a mass factor for centrifugal force, are arrayed in a line along the wheel circumferential direction X, designing of the mass balance, in the wheel width direction Y, of the sub air chamber member 10 becomes easy.

Although this embodiment has been described above, the present invention can be carried out in various embodiments without limitation.

For example, although the joint portions 33 formed in the wheel circumferential direction X are arrayed on a single line in the above-described embodiment, the joint portions 33 may be arrayed on plural lines as long as the joint portions 33 are biased to the edge portion 14a or the edge portion 14b.

Further, although the tube body 18 is protruded from the end portion of the main body portion 13 in the wheel circumferential direction X in this embodiment, the tube body 18 may be protruded in the wheel width direction Y from the main body portion 13, at a central portion in the wheel circumferential direction X of the main body portion 13, for example, at a position where the rotation preventing member 19 is arranged. Herein, the tube body 18 can also serve as the rotation preventing member 19, by being fitted into the cur-out portion 15a.

DESCRIPTION OF REFERENCE SYMBOLS

1: vehicle wheel
10: sub air chamber member (Helmholtz resonator)
11c: well portion
11d: outer circumferential surface of well portion
10f: center line
13: main body portion
14a: edge portion
14b: edge portion
16a: first standing wall surface
16b: second standing wall surface
18: tube body
18a: communication hole
25a: upper plate
25b: bottom plate
33: joint portion
33a: upper joint portion
33b: bottom-side joint portion
X: wheel circumferential direction
Y: wheel width direction
Z: wheel radial direction
SC: sub air chamber
SC1: first sub air chamber
SC2: second sub air chamber
MC: tire air chamber

The invention claimed is:

1. A vehicle wheel, comprising:
a sub air chamber member which serves as a Helmholtz resonator and is fixed to an outer circumferential surface of a well portion in a tire air chamber;
a first standing wall surface formed such as to stand from the outer circumferential surface of the well portion outward in radial direction and extend in circumferential direction of the outer circumferential surface; and
a second standing wall surface formed on the well portion such as to face the first standing wall surface in width direction of the outer circumferential surface,
wherein the sub air chamber member is formed from a resin and includes:
a main body portion including a bottom plate disposed on the outer circumferential surface side of the well portion, an upper plate forming a sub air chamber between the upper and bottom plates, and a communication hole for communication between the sub air chamber and the tire air chamber; and
edge portions that join the upper and bottom plates at both side portions of the main body portion in, and are engaged to respective groove portions formed on the first standing wall surface and the second standing wall surface, and
wherein the main body portion is provided with plural joint portions that are recessed toward inside the sub air chamber from either or both of the upper and bottom plates to partially join the upper and bottom plates, the joint portions being formed along the circumferential direction such as to be biased to a side of either the edge portion engaged to the first standing wall surface or the edge portion engaged to the second standing wall surface.

2. The vehicle wheel according to claim 1,
wherein the main body portion is longitudinally curved, matching a curvature in the circumferential direction of the outer circumferential surface,
wherein the groove portions are annular circumferential grooves formed along the circumferential direction of the outer circumferential surface of the well portion, and
wherein the edge portions are longitudinally fitted in the circumferential grooves.

3. The vehicle wheel according to claim 1, comprising:
a protruding portion provided inside thereof with the communication hole,
wherein the protruding portion is arranged such as to biased from a central portion of the main body portion to a side of either of the edge portions in the width direction, and
wherein the joint portions are biased to the side of the edge portion to which the protruding portion is biased.

4. The vehicle wheel according to claim 1,
wherein the first standing wall surface is formed on an annular standing wall standing on the well portion,
wherein the sub air chamber member includes a rotation preventing member that protrudes in wheel width direction from the either of the edge portions to prevent the sub air chamber member from deviating in the wheel circumferential direction by that the rotation preventing member is fitted into a cut-away portion formed on the standing wall, and
wherein the joint portions are formed, being biased to the edge portion side on which the rotation preventing member is formed.

5. The vehicle wheel according to claim 1,
wherein the joint portions are formed in an array on a line along wheel circumferential direction.

* * * * *